July 27, 1965
A. M. VOUTSAS
3,197,753
DIGITAL GONIOMETER
Filed Sept. 28, 1960
3 Sheets-Sheet 1
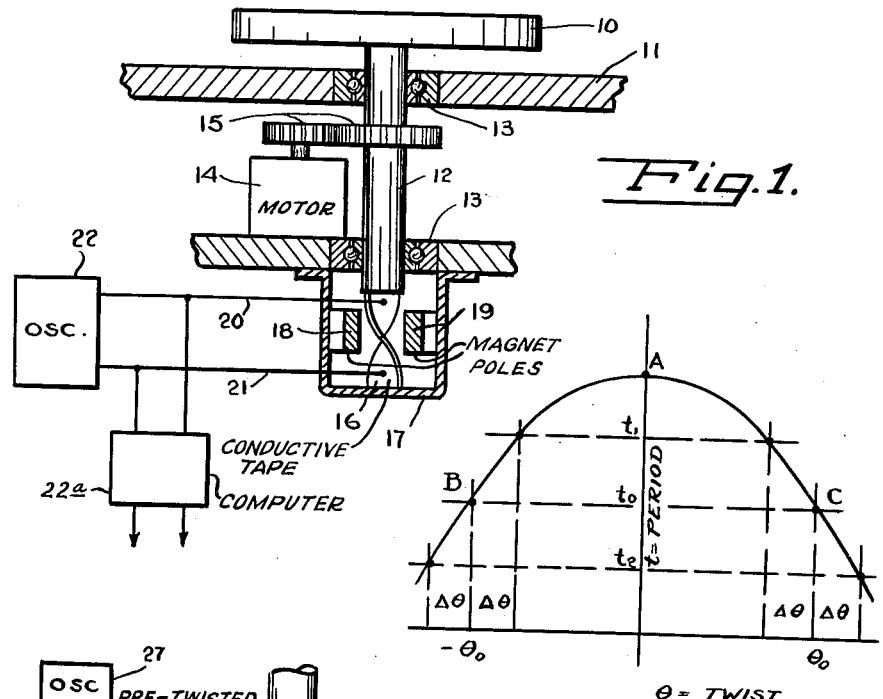
Fig.1.
Fig.2.
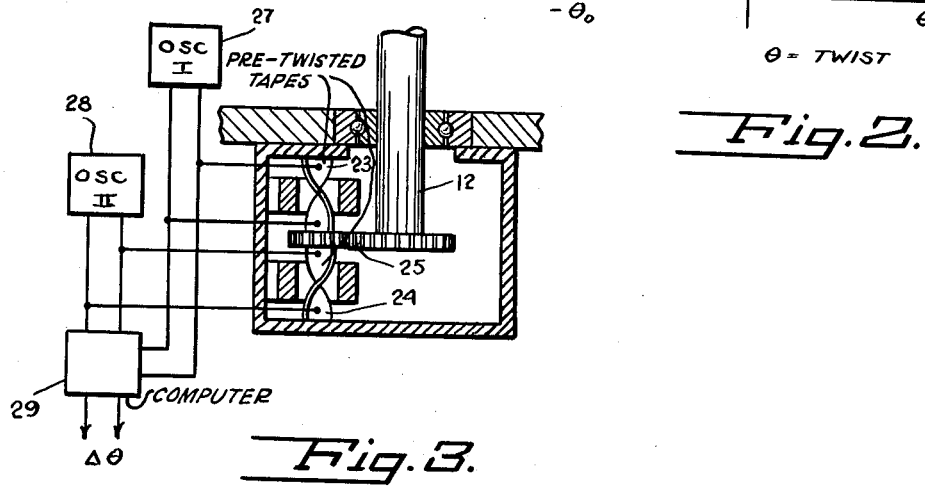
Fig.3.
INVENTOR.
ALEXANDER M. VOUTSAS
BY
Raymond A. Paquin
ATTORNEY.

July 27, 1965

A. M. VOUTSAS 3,197,753

DIGITAL GONIOMETER

Filed Sept. 28, 1960

3 Sheets-Sheet 2

INVENTOR.
ALEXANDER M. VOUTSAS
BY
Raymond A. Paquin
ATTORNEY.

July 27, 1965　　　A. M. VOUTSAS　　　3,197,753
DIGITAL GONIOMETER
Filed Sept. 28, 1960　　　3 Sheets-Sheet 3
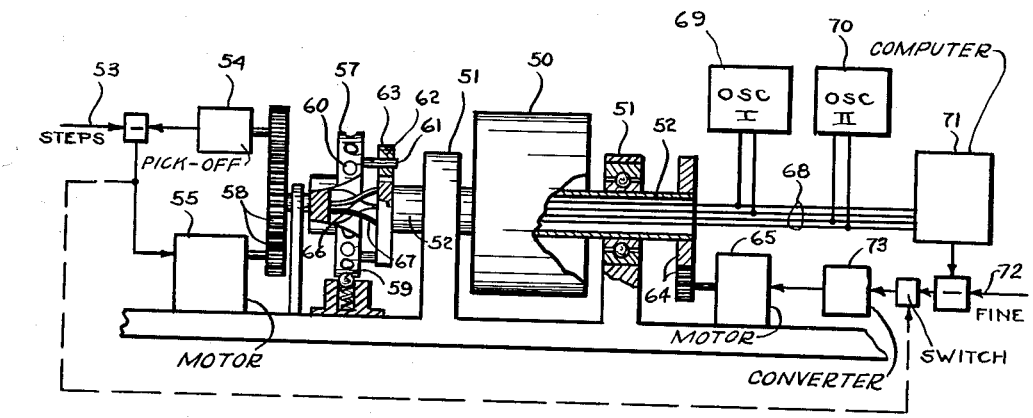
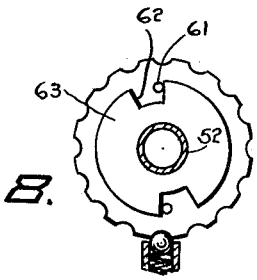
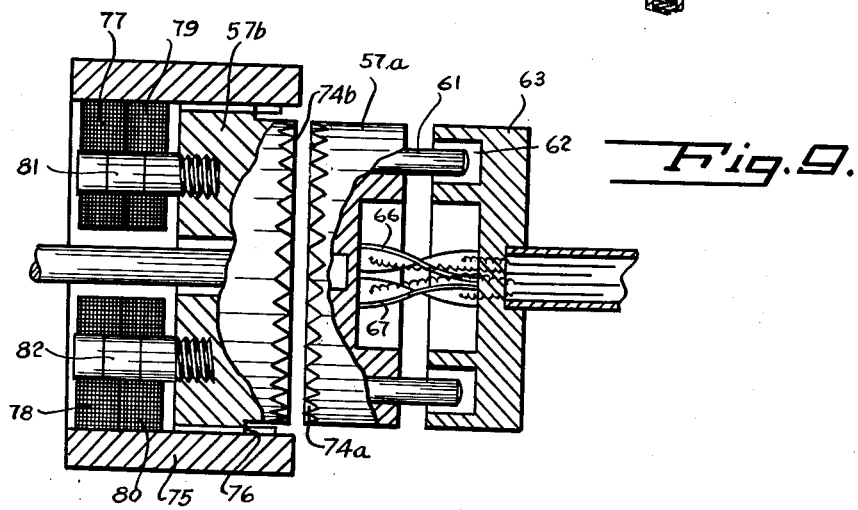
INVENTOR.
ALEXANDER M. VOUTSAS
BY
ATTORNEY.

United States Patent Office 3,197,753
Patented July 27, 1965

3,197,753
DIGITAL GONIOMETER
Alexander M. Voutsas, New York, N.Y., assignor to American Bosch Arma Corporation, a corporation of New York
Filed Sept. 28, 1960, Ser. No. 59,090
13 Claims. (Cl. 340—207)

The present invention relates to angular measurement devices and has particular reference to an angular pickoff which produces a digital output signal.

The technological advancements of today are hampered by unavailability of precision measuring instruments in many fields. One of the most difficult measurements to be made accurately is the relative angular displacements of an instrument (such as in a star tracker for example) with respect to its supporting structure (such as a flight vehicle of some sort). The present invention is a new type of angular measurement unit using the variation in the natural frequency of a vibrating member in response to a twist and which has the capability of extreme precision without excessive manufacturing difficulties.

In accordance with this invention, one end of a tape or string is attached to a relatively stationary or reference member, the other end is attached to the relatively rotatable member. The tape is placed under an initial or bias tension, and is caused to vibrate at its natural frequency by electronic oscillator means in a manner now well known in the art.

Torsional stresses in the tape, as induced by twisting the ends thereof cause corresponding changes in the natural frequency of vibration. The natural frequency of the tape is compared with a standard frequency to determine the angular twist in the tape.

In a preferred modification a pair of tapes are connected between the relatively movable members. These tapes are pre-twisted in opposite directions so that the natural frequency of one tape decreases while the natural frequency of the other tape increases under angular displacement of the two members. The frequency difference is then used as a measure of the angular displacement.

Figure 4:
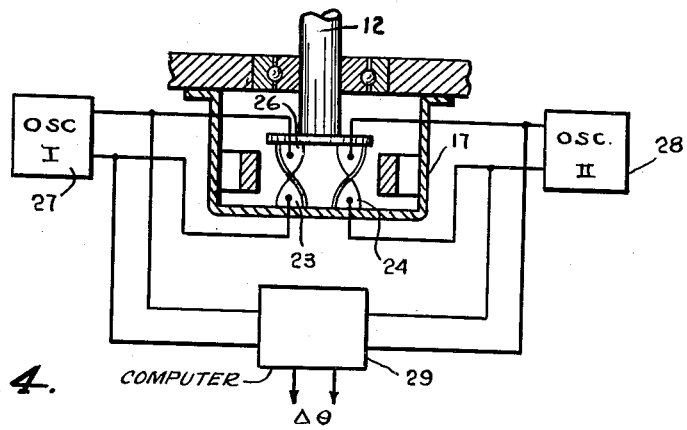
Figure 5:
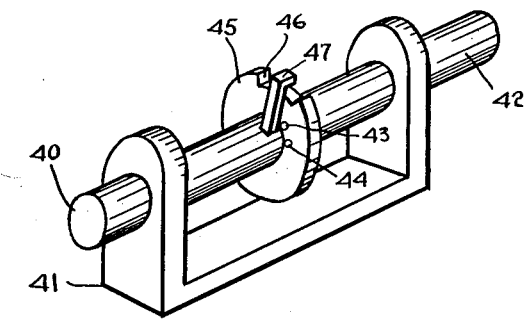
Figure 6:
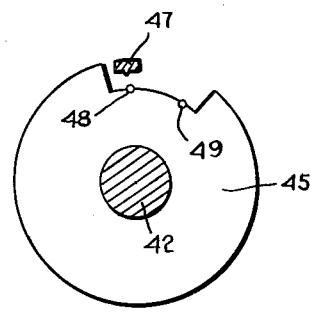

For a more complete understanding of the invention, reference may be had to the accompanying diagrams, in which FIG. 1 shows the basic concept.
FIG. 2 is a graph showing relationship between period of vibration and angle of twist.
FIG. 3 is a modification of FIG. 1.
FIG. 4 shows a modification of FIG. 3.
FIG. 5 is a schematic modification of FIG. 3 or 4 for extended range of operation.
FIG. 6 is a portion of FIG. 5 in detail.
FIG. 7 shows a particular embodiment of the schematic of FIG. 5.
FIG. 8 shows a detail of FIG. 7.
FIG. 9 is a modification of a portion of FIG. 7.

FIG. 1 illustrates a simplified application of the invention which in this instance is used for determining the angular displacement of a platform 10 with respect to a frame or support 11. The platform 10 may be attached to a shaft 12 which is journalled in bearings 13 and driven by motor 14 through gearing 15. A tape or string 16 is fastened to the lower end of shaft 12 and is stretched between the shaft 12 and a fixed member 17 attached to the frame 11. The tape 16 is kept under vibration at its natural frequency by employing the electrical effect produced by its flexure to energize an oscillator whose output is used to drive the tape. Such effects are now well known and can be accomplished in several ways. For example, as illustrated in FIG. 1, the tape 16 may be of metallic material and located in the transverse magnetic field between poles 18 and 19 of a permanent magnet. Electrical connections 20, 21 are fastened near the ends of the tape 16 and are connected to the electronic oscillator-amplifier 22. Energization of the tape by the output of amplifier 22 causes motion of the wire in the magnetic field, and motion of the wire induces a voltage across the tape which is fed back to the amplifier 22. In an alternative arrangement the tape may have piezoelectric properties which will eliminate the necessity for the magnets.

An analysis of the vibrating system of a single rectangular cross-sectional tape has resulted in an expression relating natural frequency of vibration and the angle of twist for small angular displacements, which may be written as follows:

$$f = \frac{f_0}{1 - \frac{Eb^3 d}{Kl^2 T_0}\theta^2} \quad (1)$$

where $\theta$ = angle of twist of the tape
$f$ = natural frequency of vibration of the tape when $\theta \neq 0°$
$f_0$ = natural frequency of vibration of the tape when $\theta = 0°$
$E$ = modulus of elasticity
$b$ = width of tape
$d$ = thickness of tape
$l$ = length of tape
$T_0$ = initial tension of tape plus rigidity (which equals $DEI/l^2$)
$K$ = a numerical constant In terms of the natural periods of oscillation $$t = t_0\left(1 - \frac{Eb^3 d}{Kl^2 T_0}\theta^2\right) = t_0 - t_0 \frac{Eb^3 d}{Kl^2 T_0}\theta^2$$

where $$t = \frac{l}{f}, \text{ and } t_0 = \frac{l}{f_0}$$

so that $$\Delta t = t - t_0 = -t_0 \frac{Eb^3 d}{Kl^2 T_0}\theta^2 \quad (2)$$

A high value of $\Delta t$ implies a large change of period from a given angular twist and will therefore result in better discrimination and higher sensitivity. For this purpose, the quantity on the right hand side of Equation 2 should be made as high as possible. Inspection of Equation 2 shows that wide tapes with small initial tension are desirable. Also, a high modulus of elasticity material should be used for the tapes. The angle of twist $\theta$ includes a bias or pretwist $\theta_0$ and a change in twist $\Delta\theta$. If $\theta_0$ is high $(\theta_0 + \Delta\theta)$ will be high and the change $\Delta t$ will be high. However, $\theta_0$ should not be so large as to make the small angle relationship of Equation 1 invalid.

Since $\theta = (\theta_0 + \Delta\theta)$ Equation 2 can be rewritten as $$t = t_0[l - K_0(\theta_0 + \Delta\theta)^2] \quad (3)$$

where $$K_0 = \frac{Eb^3 d}{Kl^2 T_0}$$

$$t = t_0[l - K_0(\theta_0^2 + 2\Delta\theta\theta_0 + \Delta\theta^2)] \quad (3a)$$

since $\theta_0$ is a constant, $$t = t_0[A_0 - A_1\Delta\theta - A_2\Delta\theta^2] \quad (4)$$

and since $\Delta\theta$ is small, $\Delta\theta^2$ is negligible, and $$t = t_0(A_0 - A_1\Delta\theta) \quad (5)$$

where $A_0$, $A_1$ and $A_2$ are constants.

Thus for a small variation $\Delta\theta$ of the total angle $\theta$ about a fixed bias twist $\theta_0$ the change in natural period $\Delta t$ will vary substantially linearly with the angle $\Delta\theta$ as long as $t_0$ remains constant.

This effect is graphically illustrated in FIG. 2 which shows an experimentally derived relationship I between the period $t$ of the natural frequency of a tape, and the angle of twist $\theta$ between the ends of the tape. When $\theta$ is zero, the natural period is the longest and the frequency is the lowest. As $\theta$ increases in either direction the period decreases and the frequency goes higher. Assume now that a pretwist $\theta_0$ is applied to the tape shifting the operating point from A to B. The angular deflection to be measured $\pm\Delta\theta$ is superimposed on $-\theta_0$ to vary the period of the tape between $t_1$ and $t_2$, with the period at $-\theta_0$ being $t_0$. The slopes of the curve I at $t_1$, $t_0$ and $t_2$ are very nearly equal if $-\theta_0$ is sufficiently large and the linear relationship of Equation 5 is justified.

The value of $\theta$ may be obtained by matching the natural period of the tape, $t$, against a constant value represented by $t_0$ and solving Equation 2 to obtain $\theta$. $\Delta\theta$ is then obtained by subtracting the pretwist $\theta_0$ from the total angle $\theta$. However, Equation 5 can also be used to give $\Delta\theta$ directly. In FIG. 1, solution of Equation 2 or 5 is accomplished in computer 22a to provide the $\Delta\theta$ value.

The output gradient, and hence sensitivity and linearity, can be increased by using two tapes which are oppositely pretwisted by the same amount. Thus, a second tape may be pretwisted to operate about the quiescent point C. An angular displacement $\Delta\theta$ then decreases the period of tape operating about B to $t_2$ and increases the period of the tape operating about point C to $t_1$ for example and the difference is used as a measure of the angle $\theta$. Here, $$t_1 = t_0[l - K_0(\theta_0 + \Delta\theta)^2] \quad (6)$$
$$t_2 = t_0[l - K_0(\theta_0 - \Delta\theta)^2] \quad (7)$$
$$t_1 - t_2 = 4t_0 K_0 \Delta\theta \quad (8)$$

It should be noted that the approximations required to linearize one string alone are not needed for the difference, so that Equation 8 is an exact relationship not an approximation as Equation 5.

FIGURES 3 and 4 show typical two tape arrangements for limited angular displacement. In FIG. 3 the tapes 23, 24 are placed in tandem, being fixed at the extreme ends and rotated at the center or common end by shaft 12 through gearing 25. In FIG. 4 the tapes 23, 24 are placed side by side, each tape being fixed at the lower end to frame 17 and at the upper end to shaft 12 or a flange 26 thereon. The arrangement in FIG. 4 eliminates the gearing 25 which may be a source of error.

The tapes 23 and 24 are maintained in oscillation by oscillators 27 and 28 respectively and the outputs of the oscillators are applied to a mixer or computer 29 for combining the signals so as to determine the angle of twist $\Delta\theta$. The tapes 23 and 24 are preferably pretwisted in opposite directions so that the natural frequency of one tape decreases while the natural frequency of the other tape increases under angular displacement of the two members. As an example, assume the computer 29 determines the periods of the signals from their frequencies. Equation 8 shows that $$\Delta\theta = \frac{t_1 - t_2}{4t_0 K_0} \quad (9)$$

and once $t_1$ and $t_2$ are found the division can be performed since $t_0$ and $K$ are constants for any particular instrument.

Alternatively, a computer operating directly on the frequency outputs of the oscillators I and II can be used. For example, writing Equation 1 for the two strings $$f_1 = \frac{f_0}{l - K_0 \theta_1^2}$$

and $$f_2 = \frac{f_0}{l - K_0 \theta_2^2} \quad (10)$$

Substitution of $\theta_1 = \theta_0 + \Delta\theta$ and $\theta_2 = \theta_0 - \Delta\theta$ yields $$f_1[l - K_0(\theta_0 + \Delta\theta)^2] = f_2[l - K_0(\theta_0 - \Delta\theta)^2] \quad (11)$$

Solving for $\Delta\theta$ it can be shown that $$\Delta\theta = \left[\frac{f_1 - f_2}{f_1 + f_2}\right]\left[\frac{l - K_0\theta_0^2 - K_0\Delta\theta^2}{2\theta_0 K_0}\right] \quad (12)$$

Since $\Delta\theta^2$ is small compared to $\theta_0$ for certain applications it can be neglected in the numerator of Equation 12. Also, since $\theta_0$ is a constant, $$\frac{l - K_0\theta_0^2}{2\theta_0 K_0}$$

may be represented by $K^1$ so that, $$\Delta\theta = K^1 \frac{f_1 - f_2}{f_1 + f_2} \quad (13)$$

Computer 29 may be designed to solve Equation 13.

Another form of solution may be obtained by rewriting Equation 12 as follows:

$$(f_1 - f_2) = (f_1 + f_2)\left[\frac{2K_0\theta_0}{l - K_0\theta_0 - K_0\Delta\theta^2}\right]\Delta\theta \quad (14)$$

Then, by Taylor's expansion, we obtain the following relationship:

$$\Delta f = f_1 - f_2 = (B_0 + B_1\Delta\theta + B_2\Delta\theta^2 + B_3\Delta\theta^3 \ldots)(f_1 + f_2) \quad (15)$$

Where $B_0$ is due to tape mismatch and can be determined experimentally when $\theta = 0$, $B_1$, $B_2$, $B_3$, etc., are evaluated from Equation 14.

For each actual instrument, the B constants will be precisely determined experimentally by applying known angular displacements $(\Delta\theta)$ and observing $f_1$ and $f_2$. Constants B and B can be checked at any time during the operation of the instrument as will be shown later.

For measurement of angles between a shaft and a frame greater than that which may be successfully monitored by the twisted tapes alone, the twisted tapes may be employed as a vernier indicator between the shaft and a secondary reference which is precisely positioned with respect to the frame according to discrete steps. Thus, in FIGS. 5, 6, the angular displacement of a shaft 40 with respect to frame 41 is of interest. In order to measure this angle with accuracy, a secondary reference shaft 42 is displaced with respect to frame 41 by discrete, accurately known steps. Twisted vibrating tapes 43, 44 between shafts 40 and 42 measure the angle between these shafts. The total displacement of shaft 40 is therefore equal to the sum of the displacement of shaft 42 and the angle measured by the tapes 43, 44 in the manner previously described.

This construction permits calibration of the tapes as well as accurate calibration of the individual discrete steps of the secondary reference. Considering the tapes calibration and zero setting first, the secondary reference 42 may carry a disc like member 45 having a cut-out 46 in which a finger 47 attached to shaft 40 is positioned. Pickoffs 48, 49 are carried by disc 45 and cooperate with finger 47 to produce a signal whenever the finger 47 is exactly opposite the pickoff. The pickoffs 48, 49 are separated by a precisely known amount whereby the angle of rotation of shaft 40 as the position of finger 47 is changed from opposite one pickoff to opposite the other pickoff is also precisely known. Therefore the tapes 42, 43 can be calibrated against the precisely known angle, i.e., $K^1$ of Equation 13 can be determined or the values of the B constants of Equation 15 can be verified against laboratory or factory obtained values. In order to calibrate the discrete steps on the other hand, the shaft 40 is first clamped so that the finger 47 is substantially opposite one pickoff unit and the angular difference between shafts 40, 42 is determined by the twisted vibrating tapes.

The shaft 42 is then turned through one discrete step and the angular difference is again noted. The sum of the two angular differences is equal to the angle of the discrete step of shaft 42.

It should be realized that the term measurement of angles can be applied to determination of an angular displacement as well as to means for producing a predetermined angular displacement, depending upon the auxiliary apparatus employed.

FIG. 7 shows a schematic representation of a wide range angular control device using the goniometer of the earlier figures as a vernier between precise angular steps. In this figure the object 50 is to be driven to a precise angular displacement with respect to a supporting structure 51 about the axis of shaft 52. The position to which the object 50 is to be driven is given by a pair of electrical signals, one representing discrete angular steps of say six degrees each, the other representing an interpolation between these angular steps. The discrete-step signal at line 53 is matched with the output signal of pickoff device 54, and the error signal is applied to the control circuit of motor 55 to thereby control its energization.

Motor 55 drives a plate 57 through gearing 58 until the pickoff 54 output corresponds to the signal 53 input. The exact position dictated by the signal 53 can be physically obtained by a detent mechanism generally indicated in the figure by the spring biased ball 59 urged against partially spherical depressions 60 in the edge of plate 57. In practice, the ball detent may be lacking in the requisite accuracy but it will serve to illustrate the operation of the invention in this modification. At least one pin 61 (preferably more than one) extends from the face of plate 57 and is located in a cut out 62 of the plate 63 (see FIG. 8).

The plate 63 is driven via hollow shaft 52 and gearing 64 by the vernier motor 65. A twisted tape goniometer is located between the plates 57 and 63 and is represented in FIGURE 7 by the tapes 66, 67. The auxiliaries such as magnets are not shown in order to reduce congestion in the drawing. The electrical connections 68 between the tapes 66, 67 and electronic oscillators 69, 70 are illustrated as passing through the hollow shaft 52 for convenience. The outputs of oscillators 69, 70 are also connected to the computer 71 which determines the angular twist of tapes 66, 67. The output of computer 71 is matched with the vernier signal at line 72 and the error is used to energize motor 65. A converter 73 may be required before the motor 65 of the error signal is digital while motor 65 responds to analog signals. As an example of the operation of FIGURE 7, assume that shaft 52 is to be displaced by 32° from a reference attitude with respect to the support 51. Assume further that the interval between the discrete steps to which disc 57 can be positioned is six degrees. A step signal representing 30° is applied to line 53 and a vernier signal representing +2° is applied to line 72. Motor 55 therefore drives disc 57 until its displacement with respect to support 51 is exactly 30 and disc 57 is further assured of exact displacement by the detent mechanisms 59.

Motor 65 tends to maintain the two degree vernier displacement between plates 57 and 63 so that when both motors 55 and 65 become completely deenergized the shaft 52 is displaced by 2° from plate 57 which is in turn displaced by 30° from support 51 whenever shaft 52 is displaced by 32° from support 51. The pins 61, attached to plate 57 are limiting devices, and prevent large angular displacement of plate 57 with respect to plate 63 to limit the windup of the tapes 66, 67. If the angular difference becomes too great the pins 61 engage the sides of the cutouts 62 and may assist motor 55 in driving shaft 52 to the desired position. It may be found desirable to prevent energization of motor 65 until the disk 57 has been driven to its desired position. To this end a relay switch is interposed between the vernier error signal and motor 65, the relay being energized by the signal to motor 55. The circuit to motor 65 will be completed only after the signal to motor 55 drops to zero, which occurs only after disk 57 has reached the desired position.

It will be understood that overall accuracy of the system of FIG. 7 is dependent on the accuracy of both the twisted tape goniometer and the degree of accuracy with which the position of the tape reference plate 57 can be adjusted. For a reliable indication, the accuracy of both the vernier goniometer using tapes 67, 68 and the detent mechanism 59 must not be substantially different since accuracy of the twisted tape goniometer will be defeated by an inaccurate detent. It must be further realized that the simple detent illustrated in FIG. 7 will not provide the required accuracy, and other more positive devices will be required. Such a mechanism is shown schematically in FIG. 9. Here, plate 57 is replaced by a plate 57a having axially extending, precisely machined, teeth 74a while the other clutch plate 57b has similar precisely machined teeth 74b facing plate 57a. Clutch plate 57b is movable axially in sleeve 75 and is prevented from rotational movement by the key and keyway 76. The clutch plate 57b is movable either to the right or left by energization of the solenoid windings 77, 78 or 79, 80 respectively as the solenoid armatures 81, 82 are drawn to one winding or the other.

In operation of this device, gearing 58 (FIG. 7) drives plate 57a to the position indicated by the signal 53. Solenoid windings 79, 80 are energized to drive the clutch plate 57b into the plate 57a and to engage the teeth 74a, 74b. The precise machining of the teeth insure that the displacement of plate 57a is exactly equal to an integral number of discrete steps, whereas some error may have existed in the electrical servo positioning prior to engagement of the teeth 74a, 74b. Additionally, the steps may be calibrated by the tapes as previously described by use of the precisely defined angle between two reference points. As in FIG. 5, the plate 63 to which shaft 52 is attached is driven by motor 65 until the tapes 66, 67 are twisted according to the vernier displacement called for between plates 57a and 63 is achieved.

Although the secondary reference has been described as a mechanically controlled stepping device, other controls may be employed, such for example, as magnetically electronically or optically operated controls responsive to accurately graduated devices such as discs or cylinders for example.

The foregoing description has detailed means for measuring small angular differences in FIGS. 1, 3 and 4 and has shown how to use this means for driving an object to a desired predetermined position.

The twisting of the tape is accompanied by a reaction torque between the relatively displaced members. If the tape is made mechanically strong, the angle measurement device described above can be also employed for applying a predetermined torque by regulating the angular displacement between the members according to the characteristics of the tape. Inasmuch as uses will be found for the present invention all of which employ the twisted vibrating strings in the manner described to determine the angle of twist even though the angle itself may be of secondary importance. It should be realized that the output is available in digital form. In view of the present prominence of digital computers this is a distinct advantage since no converter is required.

It should be noted that frequency and frequency difference measurements of electrical signals are most conveniently done by means of measurement of the period for each cycle. This interpretation should be accorded the corresponding terms in the claims in which only frequency and frequency difference are used.

Furthermore, it should be observed that a frequency difference is expressed as cycles per second. If, in the apparatus described, the absolute value of any angle is desired, the frequency difference must be repeatedly sampled for a predetermined interval of time, e.g., ½ second. The absolute value of a fixed angle or the average value of a variable angle may be obtained by dividing the accumulated cycles of frequency difference at any time by the elapsed time during which the cycles were accumulated or counted. If the accumulated total itself is monitored for any period of time the result will give the time integral of the displacement angle for a variable or constant angle. For each of these separate functions a selected computer externally of the angle transducer is dictated, all of which are basically within the art.

Since many changes may be made in the embodiment described within spirit of the invention, the embodiments must not be limiting but the invention must be considered in the light of the appended claims.

I claim:

1. In a device of the character described, a reference member, an elastic element connected to said reference member, a movable member rotatable about an axis with respect to said reference member and connected to said elastic element for torsionally stressing said elastic element in response to relative rotation of said members, and means for maintaining said element in vibration at its natural frequency.

2. Apparatus in accordance with claim 1, comprising a frame, said reference member being rotatable about said axis with respect to said frame according to discrete, predetermined steps.

3. In a device of the character described, a reference member, a movable member rotatable about an axis with respect to said reference member, an elastic element connected between said members and responsive to relative rotation of said members to be torsionally stressed, and means for maintaining said element in vibration at its natural frequency, said element being prestressed when said relative rotation is zero.

4. In a device of the character described, a reference member, a movable member rotatable about an axis with respect to said reference member, an elastic element connected between said members and responsive to relative rotation of said members to be torsionally stressed, electronic oscillator means for maintaining said element in vibration at its natural frequency and producing an output signal alternating at said natural frequency, a source of alternating signals, and means for comparing the frequencies of said output signal and said signal source.

5. In a device of the character described, a reference member, a movable member rotatable about an axis with respect to said reference member, an elastic element connected between said members and responsive to relative rotation of said members to be torsionally stressed, electronic oscillator means for maintaining said element in vibration at its natural frequency and producing an output signal alternating at said natural frequency, a source of alternating signals, and means for comparing the frequencies of said output signal and said signal source, said element being prestressed when said relative rotation is zero.

6. In a device of the character described, a reference member, a movable member rotatable about an axis with respect to said reference member, a pair of elastic elements connected between said members and responsive to relative rotation of said members to be torsionally stressed, and means for maintaining said elements in vibration at their natural frequencies.

7. Apparatus in accordance with claim 6, in which said elements are connected end-to-end with said rotatable member connected to the common junction of said elements and the remote ends of said elements are connected to said reference member.

8. Apparatus in accordance with claim 6, in which said elements are connected side-by-side.

9. Apparatus in accordance with claim 6, comprising a frame, said reference member being rotatable about said axis with respect to said frame according to discrete, predetermined steps.

10. Apparatus in accordance with claim 6, comprising means for comparing said natural frequencies to obtain the difference thereof and means for comparing the relative rotation between said members.

11. Apparatus in accordance with claim 10, comprising a frame, said reference member being rotatable about said axis with respect to said frame according to discrete, predetermined steps.

12. In a device of the character described, a reference member, a movable member rotatable about an axis with respect to said reference member, a pair of elastic elements connected between said members on opposite sides of said axis and responsive to relative rotation of said members to be torsionally stressed, and means for maintaining said elements in vibration at their natural frequencies, said elements being held pretwisted in opposite directions by said members when the relative rotation between said members is zero.

13. In a device of the character described: torsionally elastic means; a reference member connected to said torsionally elastic means; a member rotatable with respect to said reference member and connected to said torsionally elastic means for applying variable torsional stresses to said means; and means for vibrating said elastic means at resonance thereof.

References Cited by the Examiner

UNITED STATES PATENTS

| 1,912,213 | 5/33 | Nicolson | 340—207 |
| 2,306,137 | 12/42 | Pabst et al. | 73—67.2 |
| 2,477,085 | 7/49 | Rieber | 340—208 |
| 2,532,781 | 12/50 | Peterson | 73—70.1 |
| 2,643,367 | 6/53 | Cruzan | 73—136 |
| 2,880,612 | 4/59 | Coyne et al. | 73—71.4 |

FOREIGN PATENTS 49,425  12/38  France.

NEIL C. READ, *Primary Examiner.*

L. MILLER ANDRUS, THOMAS B. HABECKER,
*Examiners.*

UNITED STATES PATENT OFFICE
CERTIFICATE OF CORRECTION

Patent No. 3,197,753　　　　　　　　　　　　　　　　July 27, 1965

Alexander M. Voutsas

It is hereby certified that error appears in the above numbered patent requiring correction and that the said Letters Patent should read as corrected below.

Column 2, lines 20 and 21, the symbols "$0°$" and "$0°$" should both read -- $\theta_b$ --; column 4, line 35, for "B and B" read -- $B_0$ and $B_1$ --; lines 51 and 52, for "previviously" read -- previously --; column 8, line 13, for "wtih" read -- with --.

Signed and sealed this 15th day of February 1966.

(SEAL)
Attest:

ERNEST W. SWIDER　　　　　　　　　　　　　　　EDWARD J. BRENNER
Attesting Officer　　　　　　　　　　　　　　　　Commissioner of Patents